(12) United States Patent
Couery et al.

(10) Patent No.: US 8,488,256 B2
(45) Date of Patent: Jul. 16, 2013

(54) INDIRECT VISION SYSTEM ENABLING BLIND SPOTS TO BE MINIMIZED WITHOUT DISTORTING THE FORMED IMAGE

(75) Inventors: Aurelie Couery, Viroflay (FR); Corinne Payen, Montmacq (FR)

(73) Assignee: Saint-Gobain Glass France, Courbevoie (FR)

( * ) Notice: Subject to any disclaimer, the term of this patent is extended or adjusted under 35 U.S.C. 154(b) by 1064 days.

(21) Appl. No.: 11/721,904

(22) PCT Filed: Dec. 16, 2005

(86) PCT No.: PCT/FR2005/051095
§ 371 (c)(1),
(2), (4) Date: Jul. 31, 2009

(87) PCT Pub. No.: WO2006/064166
PCT Pub. Date: Jun. 22, 2006

(65) Prior Publication Data
US 2009/0303616 A1    Dec. 10, 2009

(30) Foreign Application Priority Data
Dec. 17, 2004    (FR) ...................................... 04 53052

(51) Int. Cl.
*G02B 17/00*    (2006.01)
*G02B 5/08*    (2006.01)

(52) U.S. Cl.
USPC .......................................... 359/727; 359/844

(58) Field of Classification Search
USPC .......................................... 359/727–731, 844
See application file for complete search history.

(56) References Cited

U.S. PATENT DOCUMENTS 5,526,195 A    6/1996    Thomas
5,559,640 A *  9/1996    Vachss et al. ................. 359/838

FOREIGN PATENT DOCUMENTS

| DE | 31 46 486 A1 | 6/1983 |
|----|--------------|--------|
| DE | 35 20 593 A1 | 12/1986 |
| DE | 198 13 627 A1 | 10/1999 |
| DE | 100 55 260 A1 | 7/2001 |
| EP | 1 520 751 A1 | 4/2005 |
| GB | 279 893 | 3/1928 |
| WO | WO 96/15921 | 5/1996 |

* cited by examiner

*Primary Examiner* — Scott J Sugarman
(74) *Attorney, Agent, or Firm* — Oblon, Spivak, McClelland, Maier & Neustadt, L.L.P.

(57) ABSTRACT

A rear-view system for a motor vehicle including a catadioptric assembly of at least one external or internal rearview mirror including a non-planar mirror and at least one diopter forming part of a side window of the vehicle or integrated thereto. The mirror and the diopter are configured and designed such that the image of the object restored by the mirror-diopter assembly is not substantially deformed and such that the blind spot or zone not covered by the system is minimized.

15 Claims, 6 Drawing Sheets

Prior Art

INDIRECT VISION SYSTEM ENABLING BLIND SPOTS TO BE MINIMIZED WITHOUT DISTORTING THE FORMED IMAGE

The present invention relates to the field of indirect vision systems such as rearview mirrors. As against the direct vision of objects by the eye, the term "indirect vision" denotes, within the meaning of the present description, the vision of an object by means of an auxiliary system comprising for example a mirror, by means of which an image of said object is reconstructed with or without magnification or distortion.

The present invention relates more particularly to rearview mirrors used, for example, in motor vehicles. The rearview system according to the invention makes it possible to improve road safety appreciably. Such an improvement is obtained by reducing blind spots, that is to say the sphere or field of vision which remains inaccessible to the driver, in particular when the latter carries out or attempts to carry out an overtaking maneuver. Moreover, the image formed in the rearview mirror according to the invention does not, or practically does not, undergo any deformation or distortion.

Good external rear vision is an essential element of road safety. In the great majority of current motor vehicles, external rear vision is ensured by a plane mirror situated outside the vehicle. The main problem with this system is associated with the necessarily reduced dimensions of the mirror and consequently the presence of blind spots, that is to say zones that are not accessible to the vision of the driver. The presence of such blind spots obliges the driver to make more of the checks by viewing directly, in particular in situations of lane changes, overtaking, deceleration, etc.

In 2002, it was estimated that approximately 10% of accidents were due to driving errors stemming from the existence and extent of blind spots during such maneuvers.

In order to reduce or even eliminate blind spots several solutions have been proposed.

According to a first solution, for example illustrated by patent FR 2,794,700, a camera enables information to be transmitted onto a screen inside the vehicle. This solution does not however take full account of distances and specially includes electronic components that are likely to break down, which involves the immobilization of the vehicle for the time during which they are repaired, if no auxiliary system is provided.

According to a second solution, already put into practice on some top-of-the-range vehicles, rearview mirrors have been proposed having two parts: a conventional plane part extended by an aspherical part. The aspherical part, which is furthest away from the driver, consists of an aspherical mirror, that is to say one only having a constant radius in one plane, so that the field of vision of the driver is substantially widened. Although this solution enables blind spots to be considerably reduced by doubling the angle of rear vision, it however induces optical distortions and a reduction in the size of the restored image. Such a reduction and/or distortion largely accentuates on account of this, the difficulty of perceiving the size, speed, and distance of vehicles entering into the field of said rear vision and requires on the part of the driver time to adapt, which can take a variable amount of time.

The present invention relates to a rearview system making it possible effectively to solve the problems caused by previous devices. In particular, the system according to the invention makes it possible to reduce blind spots very considerably while reconstructing an image for the driver, for example of the vehicle that is overtaking him, which is practically free from distortion and preferably has a size that is identical to, slightly greater than or very substantially approaching that said vehicle would have, if this had been observed by a conventional plane mirror. According to the invention, the object can in this way be enlarged for better visibility. Such a system obviously makes possible a very clear improvement in safety as well as driving comfort, in particular in situations such as changing lane, overtaking or decelerating.

The invention can in particular be implemented in different ways and can have various objectives, for example:
 the improvement of rear vision by reducing blind spots without reducing the size of the external rearview mirror,
 keeping the same rear vision but reducing the size of the external rearview mirror so as to improve aerodynamics and in this way to reduce substantially the fuel consumption by the vehicle,
 the improvement of rear vision and reducing the size of the rearview mirror.

According to another feature of the invention, this can also be used for correcting distortion of the reconstructed image by a diopter consisting of a nonplanar glazed surface, for example the rear window of the vehicle.

More particularly, the invention relates to a rearview system for a motor vehicle comprising a catadioptric assembly of at least one external or internal rearview mirror comprising a nonplanar mirror and at least one diopter forming part of a side window of the vehicle or integrated therein, said mirror and said diopter being configured and arranged in such a way that the image of the object restored by the mirror-diopter assembly is not, or is substantially not, distorted and in such a way that the blind spot or zone not covered by said system is minimized. A minimized blind spot is understood to mean that, with an equal area of the mirrors, the field of vision inaccessible to the driver is less than that obtained by means of a rearview mirror consisting of a plane mirror. According to an advantageous embodiment of the invention, said mirror and said diopter are equally configured and arranged in such a way that the image of the object restored by the mirror-diopter assembly is substantially identical to or is enlarged in relation to that obtained by a plane mirror. For example, the dimensions of the image restored by the mirror-diopter assembly lie between approximately 1 and approximately 2 times those obtained by a plane mirror, preferably between approximately 1 and approximately 1.5 times those obtained by a plane mirror.

Advantageously, the rearview system for a motor vehicle as previously described comprises a rearview mirror including a nonplanar mirror and a diopter forming part of the window of the vehicle or integrated therein. Integrated is understood to mean that said diopter can for example be adhesively bonded to a front side window of the vehicle or form at least part thereof. "Adhesively bonded" is understood to mean optical adhesive bonding, that is to say adhesive bonding is carried out by any technique making it possible not to modify the optical properties of the diopter-glass assembly.

The nonplanar mirror according to the invention is generally of the convex spherical type but any other nonplanar mirror can be used, for example a mirror of the concave spherical or toric type, etc.

The diopter according to the invention has at least one face of the concave or convex spherical or toric type.

Advantageously a diopter of the thin lens type or of the Fresnel lens type may be chosen. Without departing from the scope of the invention, said lens is convergent or divergent and preferably convergent.

According to a possible embodiment, the diopter is made of glass or preferably a hard plastic such as polycarbonate.

According to a particular embodiment, said diopter consists of a laminated glass plate incorporating a sheet of plastic, such as PVB (polyvinyl butyral), with a variable optical index.

For example, the diopter may constitute all or part of a front fixture of a front side window of a motor vehicle.

The invention also relates to a front side window for a motor vehicle comprising or incorporating a diopter as previously described as well as the motor vehicle incorporating such a diopter or the rearview system previously described.

The invention will be better understood on reading the following two examples of embodiments of the invention, illustrated by the appended FIGS. 1 to 6 respectively.

These examples are provided purely as an illustration and should not in any of the features described be considered as limiting the scope of the present invention.

Figure 1:
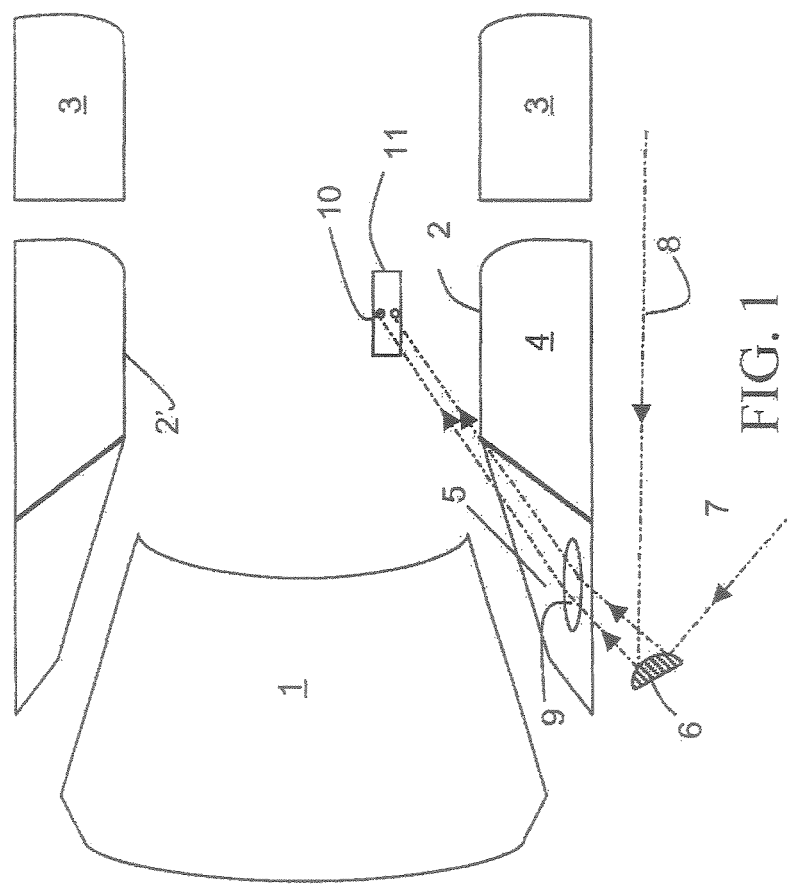
FIG. 1 illustrates a first embodiment of a rearview system according to the invention including a diopter incorporated in the front side window of a motor vehicle associated with a rearview mirror positioned outside the passenger compartment.

FIG. 1 shows views from above of various windows fitted to a motor vehicle, namely the windshield 1 the right-hand front side window 2 and left-hand front side window 2' and the rear side windows 3. The side windows 2 comprise a sliding part 4 made of glass and a fixed part or front fixture 5 of which at least part 9 is made of polycarbonate. The rearview mirror comprising a convex spherical mirror 6 according to the invention is configured, positioned and adjusted so that all the light rays coming from various directions included between the two extremes represented by the broken lines 7 and 8 can be reflected by said mirror 6 to the polycarbonate part 9 of the front fixture 5. As will be described in the remainder of the description, the polycarbonate part 9 advantageously acts as a diopter. The image of a vehicle transmitted by the convex mirror 6, of which the dimensions are reduced and which exhibits optical distortion, is corrected by the diopter 9. This is, according to the invention, configured in such a way that a normal image is restored to the eyes 10 of the driver. The term "normal" is understood to mean that said distorted and reduced image is rectified and restored to a scale of the vehicle substantially identical to that which the driver would have using only a conventional plane mirror. A normal image can also be understood, according to the invention, to be an image substantially without distortion, within the meaning of European standard 2003/97/EC.

According to the invention, the dimensions of the mirror 6 and the diopter 9 are adapted by construction so that the correction can be carried out whatever the point of vision of the driver, in particular according to his driving position, height and morphology, for example within the meaning of European standard 2003/97/EC. In the plane of projection of FIG. 1, all possible positions are shown diagrammatically, for example by the rectangle 11. Means can also be provided according to the invention for adjusting the rearview mirror that are directly accessible to the driver.

Figure 2:
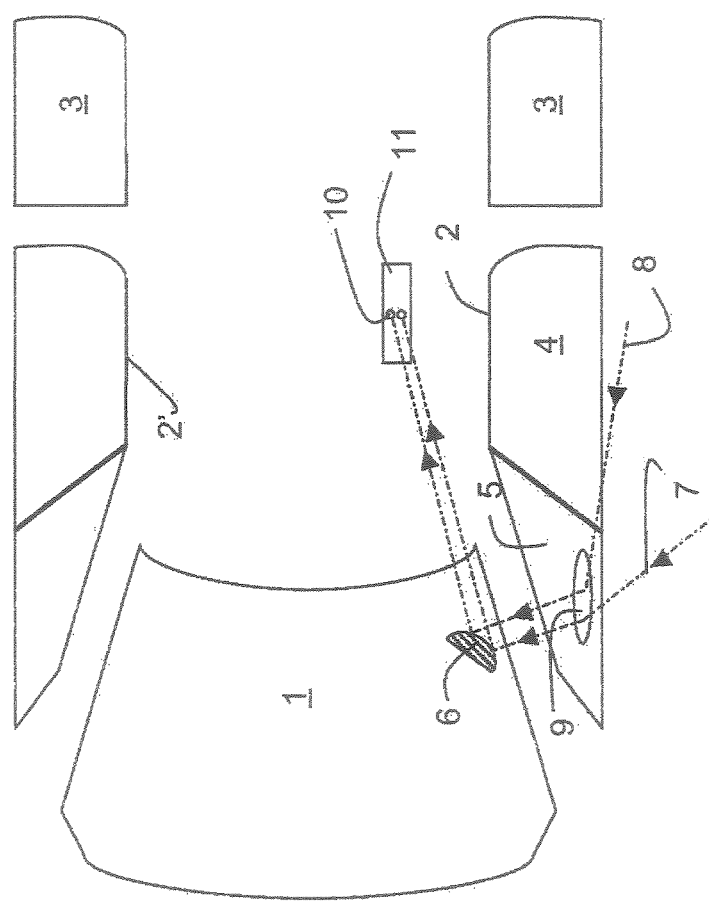
FIG. 2 illustrates a second embodiment of a rearview system according to the invention including a diopter incorporated in the front side window of a motor vehicle associated with a rearview mirror positioned inside the passenger compartment.

FIG. 2 illustrates another possible embodiment of the invention, similar to the previous one, but wherein the rearview mirror is this time positioned inside the passenger compartment of the vehicle. In this figure, the same numbering has been kept to denote identical elements or those providing the same function as in the previous embodiment. According to this embodiment, light rays pass through the polycarbonate diopter 9 present on the front fixture 5 which has a double function of deflecting said rays towards the interior convex mirror 6 and of correcting "in advance" distortions and reductions induced by the convex mirror. As in the previous embodiment, the driver will observe a normal image in the previously defined sense.

The following non-limiting examples of embodiments of the invention are given with the aim of illustrating some possible embodiments of the present rearview system. In these two examples, a common situation is envisaged of being overtaken by another vehicle. It has been chosen to model the image for example of a vehicle situated 10 meters to the rear of the top of an external rearview mirror comprising a convex mirror of radius 0.450 m.

EXAMPLE 1

In this first example, an attempt has been made to calculate, in the case of the example of an embodiment of the invention illustrated by FIG. 1, the minimum optical properties of the various elements making up the rearview system described.

According to well-known principles of geometrical optics, if A is the object (the vehicle), A' the image of the object produced by the convex spherical mirror 6, S the edge of the mirror 6 and C the center of the sphere from which the mirror has been cut, the four points being situated substantially on the optical axis, the reduction induced by the convex mirror is given by the relationship:

$$\gamma = A'/A = CA'/CA,$$

with:

$$\frac{1}{CA} + \frac{1}{CA'} = \frac{2}{CS}$$

If inaccuracies are ignored, due to the fact that the rays are not all perfectly parallel to the optical axis, the distorted image of the vehicle is therefore formed behind the mirror at a distance CA'=0.230 m.

The object is reduced by 97.7% by the convex mirror.

Figure 3:
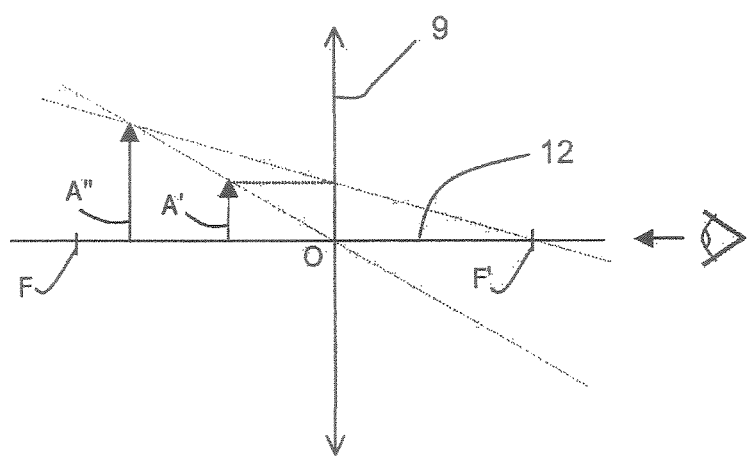
FIG. 3 is a diagrammatic representation of the optical reference constituted by the visual axis of the driver.

A calculation has then been made, from this distorted and reduced image, of the minimum radius of curvature that a diopter according to the invention should adopt, by considering secondly the optical reference consisting of the visual axis 12 of the driver (FIG. 3).

In the case of the Mégane II® marketed by Renault, the rearview mirror is situated 0.253 m from the side window, namely from the diopter.

In the optical reference consisting of the visual axis of the driver, it is then possible to determine the distance OA' between the center of the diopter O, which is chosen to be a thin lens, and the image A' of the vehicle generated by the convex mirror:

$$OA'=OC+CA'=0.253+0.230=0.483 \text{ m}.$$

According to the invention, a real undistorted image of the vehicle is finally sought in the optical reference of the visual axis of the driver. A convergent lens can advantageously be used, arranged so that the corrected image A" of A' is formed between the center O of the lens and the object focal point F of the lens (FIG. 3).

It can be seen on the construction of FIG. 3 that in this case it is possible to obtain an enlargement of the image A'. The choice of a convergent lens for which the object image focus F is greater than or equal to 0.483 m makes it possible advantageously to obtain a final image A" of which the size approaches that obtained in the conventional case of the use of a plane mirror.

For reasons relating to esthetics and the aerodynamics of the car, the outer face of the diopter can be chosen to be plane. In this case, by applying the relationship:

$$\frac{-1}{F} = (n-1)\left(\frac{1}{R1} - \frac{1}{R2}\right)$$

with n the index of the diopter,
n the index of the diopter (n=1.585 for polycarbonate),
R1 is the radius of the outer face of the diopter (rearview mirror side). If the face is plane, R1=∞,
R2 is the radius of the inner face of the diopter (passenger compartment side), it is calculated that the minimum radius of curvature R2 of the diopter on its inner face should be greater than 0.284 m.

It is demonstrated in this way that the present invention can be implemented without difficulty and without the need to modify the position of the existing rearview mirror or mirrors on current vehicles.

EXAMPLE 2

In this example, an attempt has been made to model, for similar conditions to those of the previous example, the image obtained by a driver whose vehicle is fitted with a rearview system as previously described in relation to FIG. 1. The optical system that the rearview mirror and the diopter form (the front fixture) being catadioptric and the optical axis of the driver being different from that of the diopter, optimization of the optical properties of the rearview system according to the invention, in particular of the radius of curvature of the diopter, has been performed on a Silicon Graphics station with the aid of Studio© software marketed by Alias Wavefront.

Calculations by the software have enabled the size and optical power of said diopter to be refined so that the image restored to the driver is not distorted or is only slightly distorted and has a size substantially identical to or even enlarged in relation to the image obtained by a plane mirror. In particular, by means of Studio© software, the radius of the corresponding lens has been refined by dichotomy to an optimum rendering of the image that can be suitable whatever the point of vision of the driver, according to his driving position, height and morphology, for example within the meaning of European standard 2003/97/EC. For this example, a rearview mirror was used comprising a convex mirror with a radius of 0.450 m and twice as small as rearview mirrors of the prior art. As can be seen by comparison with FIGS. 4 and 5, the rearview mirror according to the invention has an area twice as small as that of the aspherical rearview mirror according to the prior art.

If the outer face of the diopter is plane (R1=∞) an optimum value of the inner radius of curvature of the diopter R2=0.425 m is obtained after refinement by the software. Under these conditions, the image of the vehicle observed by the driver is enlarged by a factor γ=2.96 compared with the image formed by the convex spherical mirror 6.

Images of the object that the driver perceives have also been simulated from Studio© software.

Figure 4:
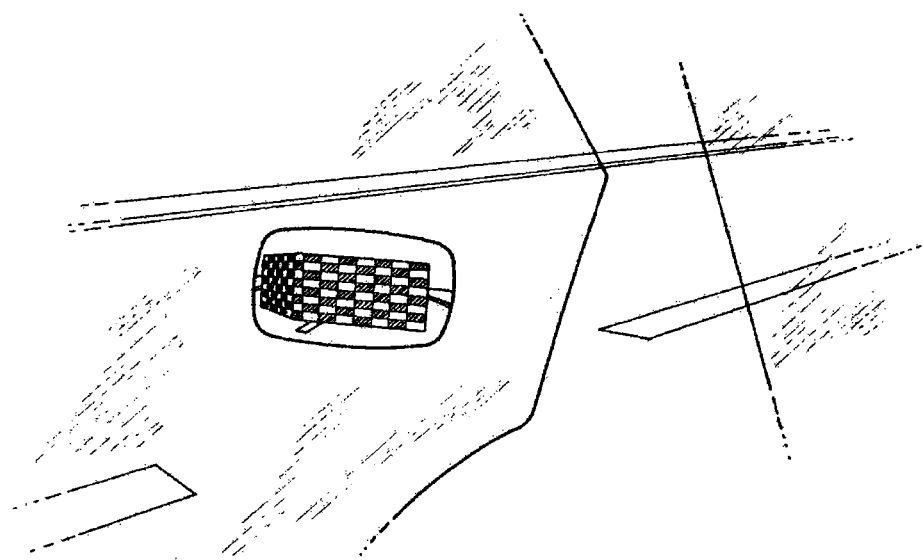
FIG. 4 shows the final image obtained of the test card for simulating an aspherical rearview mirror according to the prior art.
Figure 5:
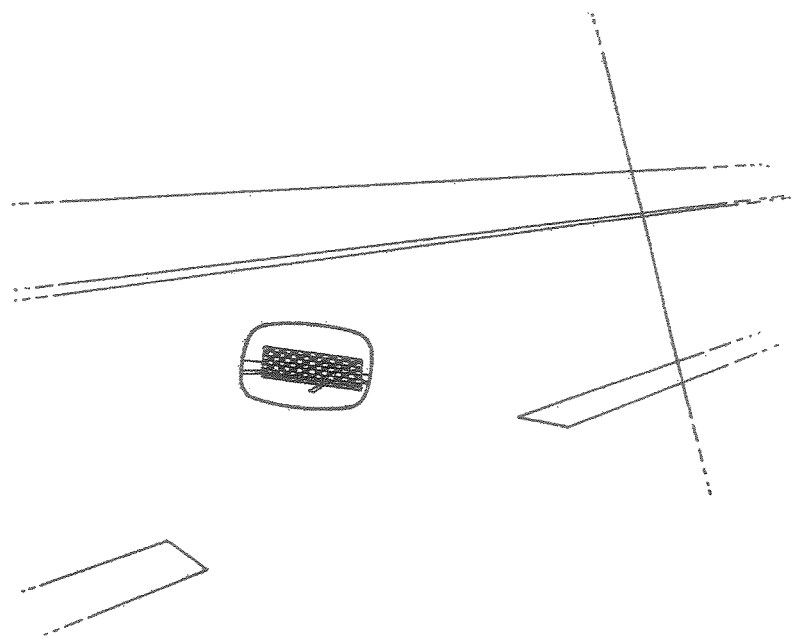
FIG. 5 shows diagrammatically the image obtained by the convex mirror before correction.
Figure 6:
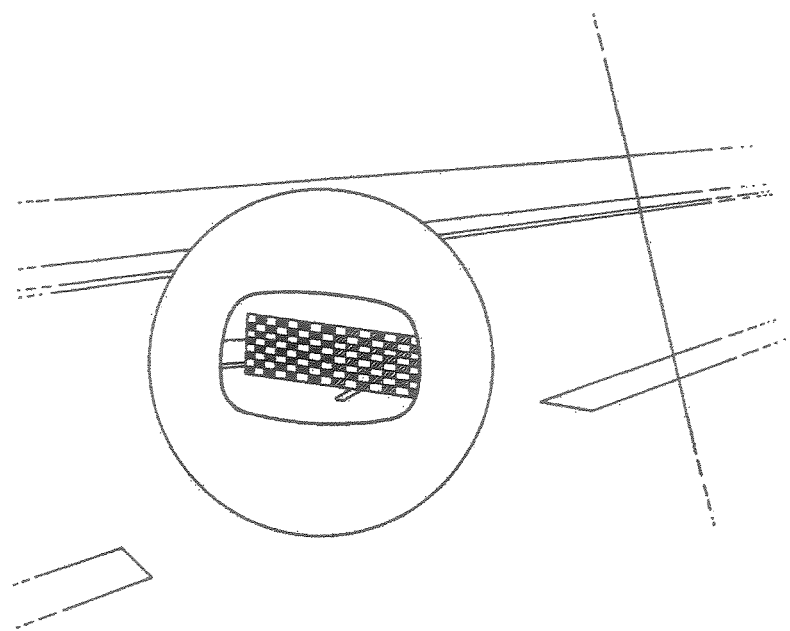
FIG. 6 illustrates the image of the test card observed by the driver after correction by the diopter inserted on the front window of the vehicle.

More particularly FIG. 4 shows the final image obtained of the test card for the simulation of an aspherical rearview mirror according to the prior art, FIG. 5 the image obtained by the front correcting convex mirror, and FIG. 6 the image of the test card perceived by the driver after correction by the diopter inserted on the front window of the vehicle.

A comparison between FIGS. 4, 5 and 6 shows that the rearview system according to the invention makes it possible at the same time to obtain an undistorted image with a comparable size to that obtained by a plane mirror, using a rearview mirror with a size twice as small and while minimizing blind spots.

Naturally, the invention is not limited to the embodiments described. In particular, it is possible, without departing from the scope of the invention, to use a material other than polycarbonate, for example glass or a plane diopter having a variable index, consisting for example of a plate of laminated glass incorporating a sheet of plastic such as PVB (polyvinyl butyral) with a variable optical index. According to another possible embodiment, a Fresnel lens, adapted as a consequence, can also be used as diopter.

Moreover, for reasons of simplicity, examples 1 and 2 have been calculated for a simple optical system in which the correcting diopter is ideally positioned along the optical axis formed by the eyes of the driver and the rearview mirror (see FIG. 3). When said diopter is positioned on the side window of a vehicle, its position generally differs substantially from this ideal case and it would be possible for the radius of curvature of the diopter to be adapted in particular and adjusted to each situation, especially to the respective positions of the rearview mirror, the eye of the driver and the side window, according to techniques and calculations currently used in the field of optics. In particular, a non-constant radius of curvature of the diopter used can be envisaged according to the invention in order to solve this problem.

Also, the diopter can be positioned on any one of the windows of the vehicle (right-hand side window as described, left-hand side window, rear window, etc) the associated rearview mirror being quite obviously positioned as a consequence, inside or outside the vehicle.

The invention claimed is:

1. A rearview system for a motor vehicle, enabling an undistorted image of an object to be restored, comprising:
   a catadioptric assembly of at least one external or internal rearview mirror comprising a nonplanar mirror and at least one diopter forming part of a side window of the vehicle or integrated therein,
   the mirror and the diopter being configured and arranged such that the image of the object restored by the mirror-diopter assembly is not, or is substantially not, distorted and such that the blind spot or zone not covered by the system is minimized,
   wherein an outer face of the diopter is planar with an outer face of the side window of the vehicle.

2. The system as claimed in claim 1, wherein the mirror and the diopter are equally configured and arranged such that the image of the object restored by the mirror-diopter assembly is substantially identical to or is enlarged in relation to that obtained by a plane mirror.

3. The system as claimed in claim 1, wherein dimensions of the image restored by the mirror-diopter assembly lie between 1 and 2 times those obtained by a plane mirror, or between 1 and 1.5 times those obtained by a plane mirror.

4. The system as claimed in claim 1, comprising an external rearview mirror including a nonplanar mirror and a diopter forming part of the window of the vehicle or integrated therein.

5. The system as claimed in claim 1, wherein the nonplanar mirror is of convex spherical, concave spherical, or toric type.

6. The system as claimed in claim 1, wherein the diopter has at least one face that is of concave, or convex spherical, or toric type.

7. The system as claimed in claim 1, wherein the diopter is of thin lens type or of Fresnel lens type.

8. The system as claimed in claim 7, wherein the nonplanar mirror is of convex spherical type and wherein the lens is convergent.

9. The system as claimed in claim 1, wherein the diopter has a non-constant radius of curvature.

10. The system as claimed in claim 1, wherein the diopter is plane and has a variable index.

11. The system as claimed in claim 1, wherein the diopter is made of glass, or a hard plastic, or polycarbonate.

12. The system as claimed in claim 11, wherein the diopter comprises a laminated glass plate incorporating a sheet of plastic, or a sheet of PVB (polyvinyl butyral), with a variable optical index.

13. The system as claimed in claim 1, wherein the diopter constitutes all or part of a front fixture of a front side window of a motor vehicle.

14. A motor vehicle incorporating the system as claimed in claim 1.

15. A side window for a motor vehicle comprising or incorporating a diopter as claimed in claim 6.

* * * * *